United States Patent [19]
Morikawa

[11] Patent Number: 5,339,525
[45] Date of Patent: Aug. 23, 1994

[54] REINFORCING STEEL SHEAR

[75] Inventor: Sumio Morikawa, Sakai, Japan

[73] Assignee: Oyodokomatsu Co., Ltd., Neyagawa, Japan

[21] Appl. No.: 61,520

[22] Filed: May 17, 1993

[30] Foreign Application Priority Data

Oct. 14, 1992 [JP] Japan .............................. 4-078087[U]

[51] Int. Cl.⁵ ......................... E04G 23/08; B23P 15/40
[52] U.S. Cl. ..................................... 30/134; 241/101.7
[58] Field of Search ........................ 30/134; 241/101.7

[56] References Cited

U.S. PATENT DOCUMENTS

| 4,198,747 | 4/1980 | LaBounty | 30/134 |
| 4,776,093 | 10/1988 | Gross | 30/134 |
| 4,903,408 | 2/1990 | Tagawa et al. | 30/134 X |
| 5,187,868 | 2/1993 | Hall | 30/134 |

Primary Examiner—Douglas D. Watts
Attorney, Agent, or Firm—Millen, White, Zelano & Branigan

[57] ABSTRACT

A reinforcing steel shear including a stationary lower jaw and a movable upper jaw, the upper jaw being divided into two segments which can be bolted together in alternative positions to change the maximum allowable degree of jaw opening. This adjustable jaw opening feature makes the shear useful for various shearing load sizes.

2 Claims, 6 Drawing Sheets

… ……………………………………………

REINFORCING STEEL SHEAR

TECHNICAL FIELD

The present invention relates to a heavy duty shear for use in the demolition of buildings and other applications.

BACKGROUND OF THE INVENTION

Generally, in the demolition of reinforced concrete buildings, a reinforcement shear mounted at the free end of the arm of a power shovel is employed. As an example of such shear, there is known a shear comprising a stationary lower jaw having a cutting edge and a movable upper jaw having an associated cutting edge and adapted to open and close with respect to said stationary lower jaw, said cutting edges being respectively straight edges (cf. Japanese Utility Model Application Kokai S-54-167871).

This type of shear having straight cutting edges as mentioned above can shear iron sheet and the like neatly but cannot shear reinforcing steel or the like because such a shearing load tends to slip forward unless fixed somehow in position.

To solve this problem, U.S. Pat. No. 4,519,135 proposes a shear illustrated in FIG. 6. This shear comprises a lower jaw I rigidly mounted on the arm 2 of a power shovel and an upper jaw 4 connected to said lower jaw 1 through a pivot 4 so that the upper jaw may open and close with respect to the lower jaw. In use of the shear, the steel reinforcement, for instance, is trapped between said upper and lower jaws and the upper jaw 4 is then closed by means of an associated hydraulic cylinder 5 to shear the reinforcement. In this shear, the upper and lower jaws are recessed away from each other in a longitudinally intermediate position to prevent forward displacement of the gripped load on shearing.

In addition, the upper jaw 4 is formed as a single member and the lower jaw 1 as two parallel members so that the forward end of the upper jaw 4 may descend into the clearance between the two members of the lower jaw 1. These two parallel members of the lower jaw 1 are interconnected by a front end member 6. The mating edge portions of the upper and lower jaws 1,4 are respectively provided with plural cutting edges 7,8,9,10. Moreover, wear plates 11,12 are rigidly secured to the upper and lower jaws, respectively, on the side opposite to said cutting edges 7,8,9,10 so that the upper jaw 4 will not be deflected sideways in shearing.

However, the proposed shear has the problem that the cutting edge 7 of the upper jaw 4 and that 9 of the lower jaw 1 are parallel even in the maximum opening position of the jaws and do not open further so that the maximum degree of opening cannot be large. In other words, generally any shear designed to preclude a forward slip of the gripped load cannot have a large opening.

SUMMARY OF THE INVENTION

The object of the present invention is to overcome the above disadvantages of the prior art.

The present invention is directed to a reinforcement steel shear adapted to be swingably mounted at the forward end of a construction machine arm and including a stationary lower jaw having cutting edge means and a movable upper jaw having cutting edge means for shearing a load, comprising a hydraulic cylinder disposed in a substantially vertical position and connected to said upper jaw at its rear end, said upper jaw being divided into a forward segment and a rear segment which are interconnected by bolt means selectively installed in one or another set of bolt holes provided in a plurality of rows whose imaginary downward extensions intersect each other.

The present invention is now described in further detail with reference to the accompanying drawings which illustrate the preferred embodiments.

DETAILED DESCRIPTION OF THE INVENTION

Figure 1:
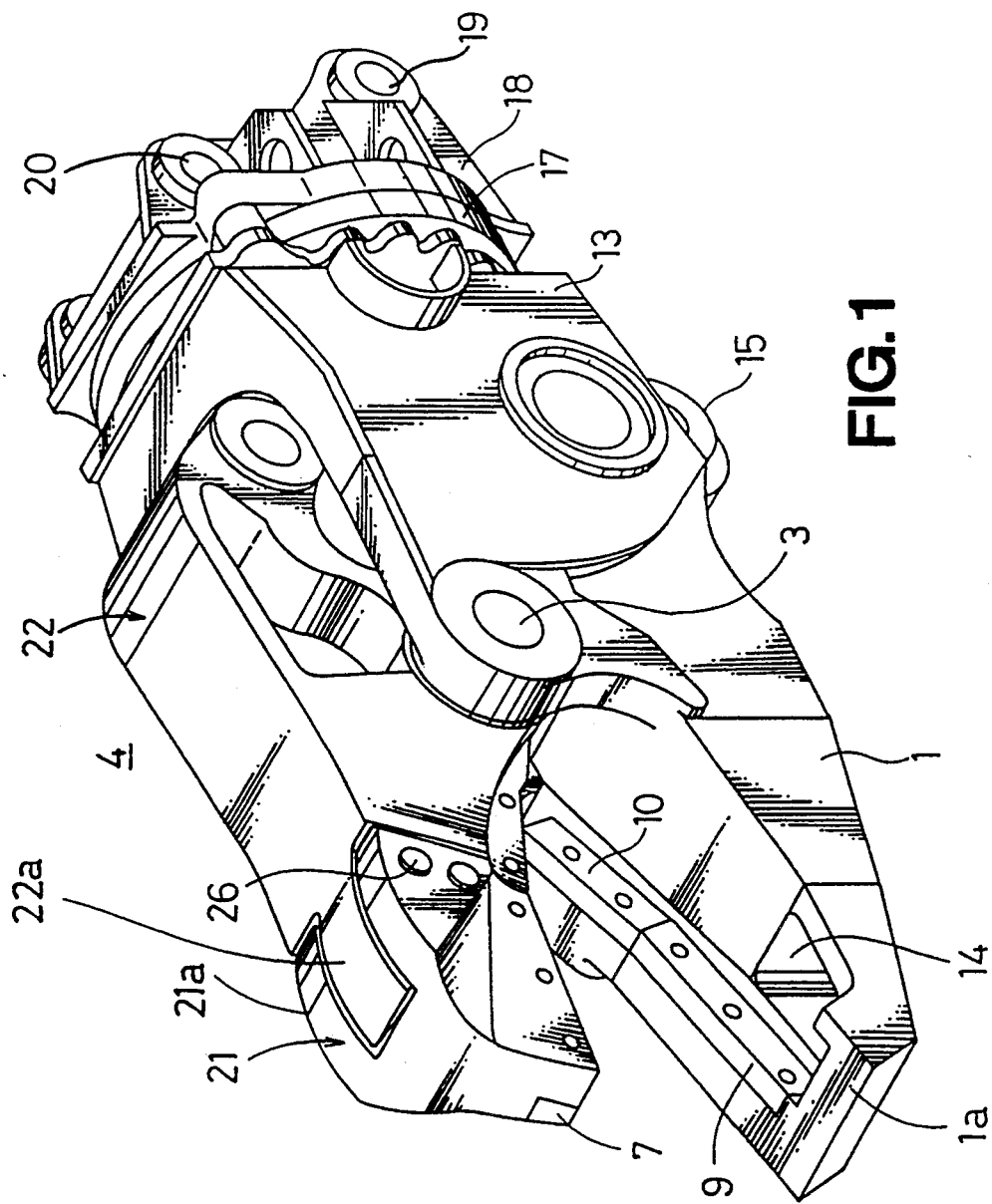
FIG. 1 is a perspective view showing a first embodiment of the present invention.

The steel shear of the invention weighs about 3800 kg and has a cutting edge length of about 800 mm. This steel sheer, shown in FIGS. 1 through 4, is characterized in that the maximum opening of its jaws can be selectively set to two degrees, viz. about 600 mm and about 390 mm.

This steel shear has a lower jaw 1 extending integrally from a shear body 13 and an upper jaw 4 which is swingably connected to said lower jaw through a pivotal shaft 3 in such a manner that the upper jaw 4 may swing vertically to open and close with respect to said lower jaw 1. When a shearing load is trapped between the upper jaw 4 and lower jaw 1 in the above arrangement and the upper jaw 1 is closed by means of an associated hydraulic cylinder 5a, the load trapped between the jaws is firmly gripped and shorn.

The upper jaw 4 and lower jaw 1 are recessed apart in an intermediate longitudinal position so that the gripped load will not slide longitudinally forward on gripping and shearing.

Figure 2:
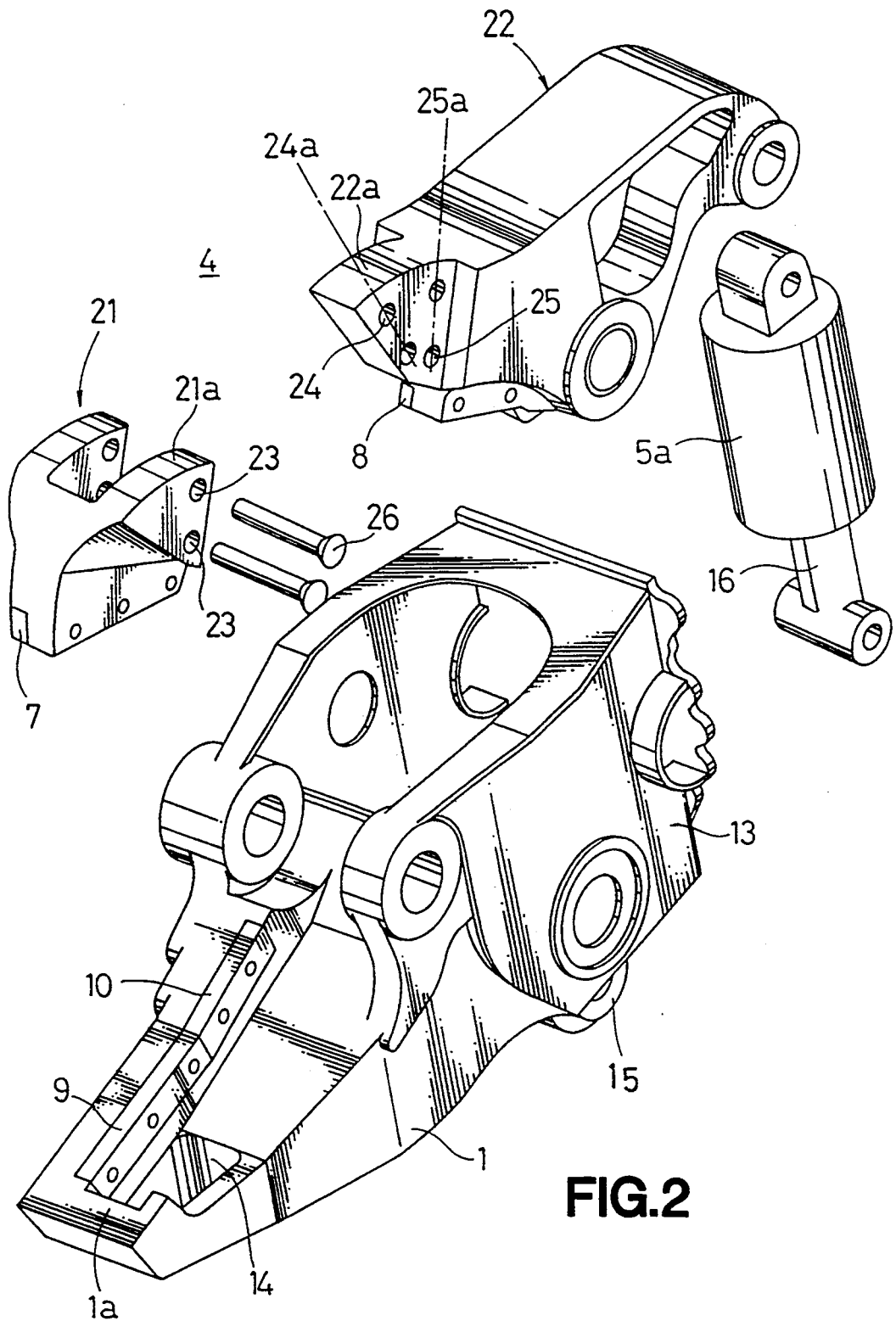
FIG. 2 is a disassembled perspective view of the embodiment of FIG. 2.

The upper surface of the lower jaw 1 is formed with a land 1a configured in the shape of the numeral "7" and two cutting edges 9 and 10 are mounted on the shank portion of this 7-shaped land as shown in FIGS. 1 and 2. Furthermore, the forward end of the lower jaw 1 is provided with a through-opening 14 for accepting the overlying forward end of the upper jaw 4.

The bottom of said shear body 13 is provided with cylinder bosses 15 by which the free end of a piston rod 16 of a hydraulic cylinder 5a is rotatably supported. This hydraulic cylinder 5a is disposed in a substantially vertical position within the shear body 13 and connected to the rear end of said upper jaw 4. Thus, as the hydraulic cylinder 5a is operated, the upper jaw 4 is caused to swing upward or downward to open or close with respect to the lower jaw 1.

A bracket 18 is rigidly secured to the rear wall of the shear body 13 through a swing bearing 17. This bracket 18 is provided with an arm pin 19 for coupling with the arm of a power shovel (not shown) and a pin 20 to which the force of a booming hydraulic cylinder (which is installed in parallel with said arm) is transmitted for rotating the bracket 18.

The swing bearing 17 mentioned above has a built-in internal gear (not shown) which is in mesh with the pinion of a built-in hydraulic motor (not shown), whereby the steel shear may be swung through 360° with respect to the power shovel arm.

In this embodiment of the invention, the maximum opening between cutting edges 7 and 9 may be selectively set to whichever of two degrees. Thus, the upper jaw 4 is divided into a forward upper jaw segment 21 and a rear upper jaw segment 22 and a cutting edge is mounted on each of said for-ward and rear upper jaw segments 21,22. Stated differently, the upper jaw 4 is split into two parts along the junction between the cutting edges 7 and 8.

The rear part of the forward upper jaw segment 21 constitutes a fork 21a, while the forward part of the rear upper jaw segment 22 is formed with a tongue or projection 22a configured to fit into said fork 21a.

The fork 21a has a pair of bolt holes 23,23 formed in a vertical row, while the projection 22a is provided with two pairs of bolt holes 24,24 and 25,25 disposed in a first row 24a and a second row 25a, respectively. These pairs of bolt holes 23,23,24,24 and 25,25 are respectively disposed at the same pitch so that the fork 21a and projection 22a may be rigidly connected to each other by means of a couple of bolts 26.

As illustrated, the first row 24a of bolt holes 24,24 is inclined forward with respect to the second row 25a of bolt holes 25,25 so that the downward imaginary extension of said first row 24a and that of said row 25a intersect with each other. In this arrangement, as the bolts 26,26 set into the holes 25,25 in the second row 25a are lined up with the bolt holes 23 of the fork 21a and threaded tight, the forward end of the upper jaw 4 may open with respect to the lower jaw 1 to the maximum degree of opening $L_1$ as shown in FIG. 3.

Figure 4:
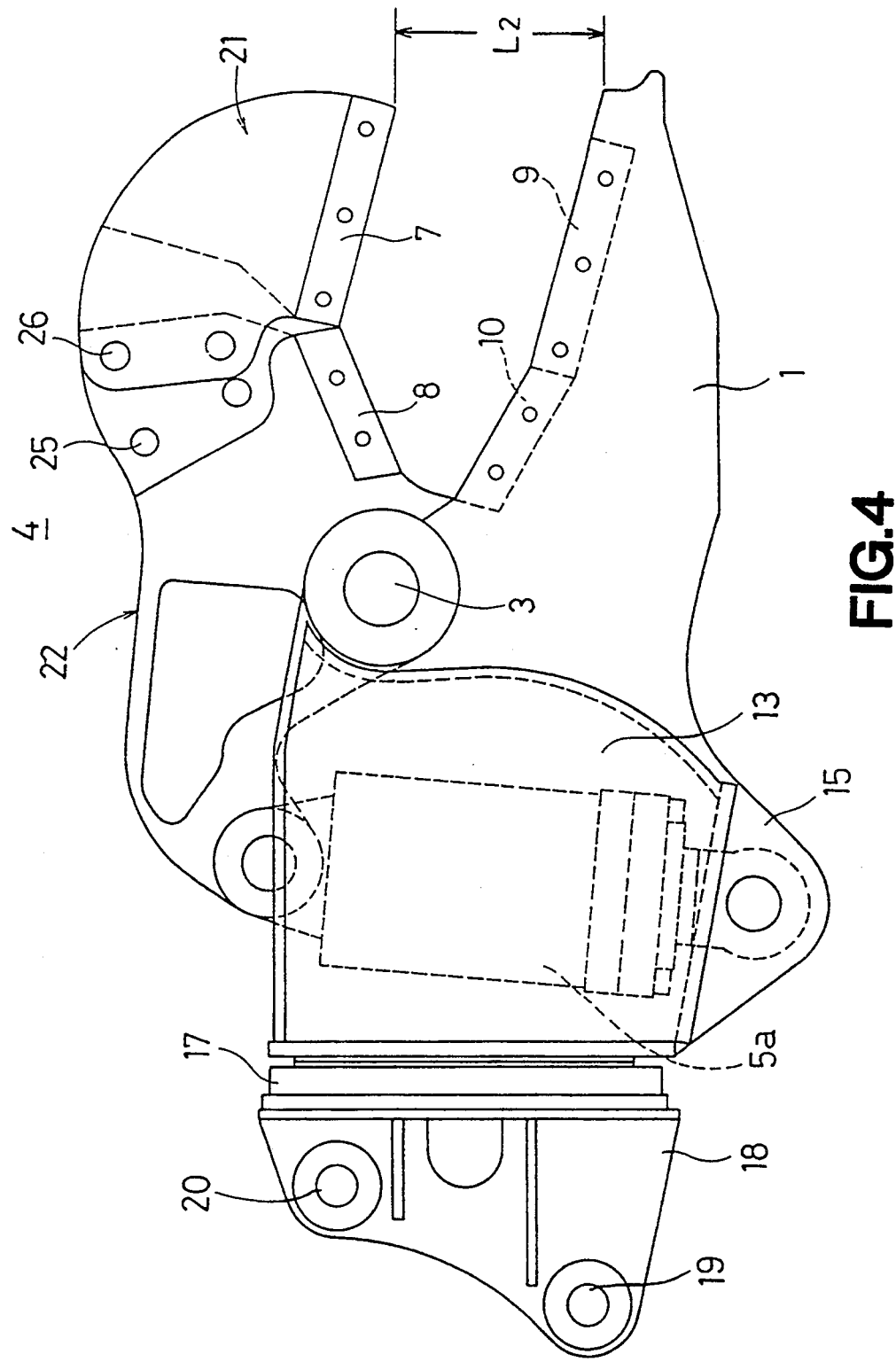
FIG. 4 is a similar side elevation view of the same embodiment with its jaws set to a smaller maximum opening.

On the other hand, as the bolts 26,26 set into the holes 24,24 in the first row 24a are lined up with the bolt holes 23,23 of the fork 21a and threaded tight, the forward end of the upper jaw 4 may open with respect to the lower jaw 1 to the maximum degree of opening $L_2$ as shown in FIG. 4. The relationship of said maximum degrees of opening is $L_1 > L_2$.

Figure 3:
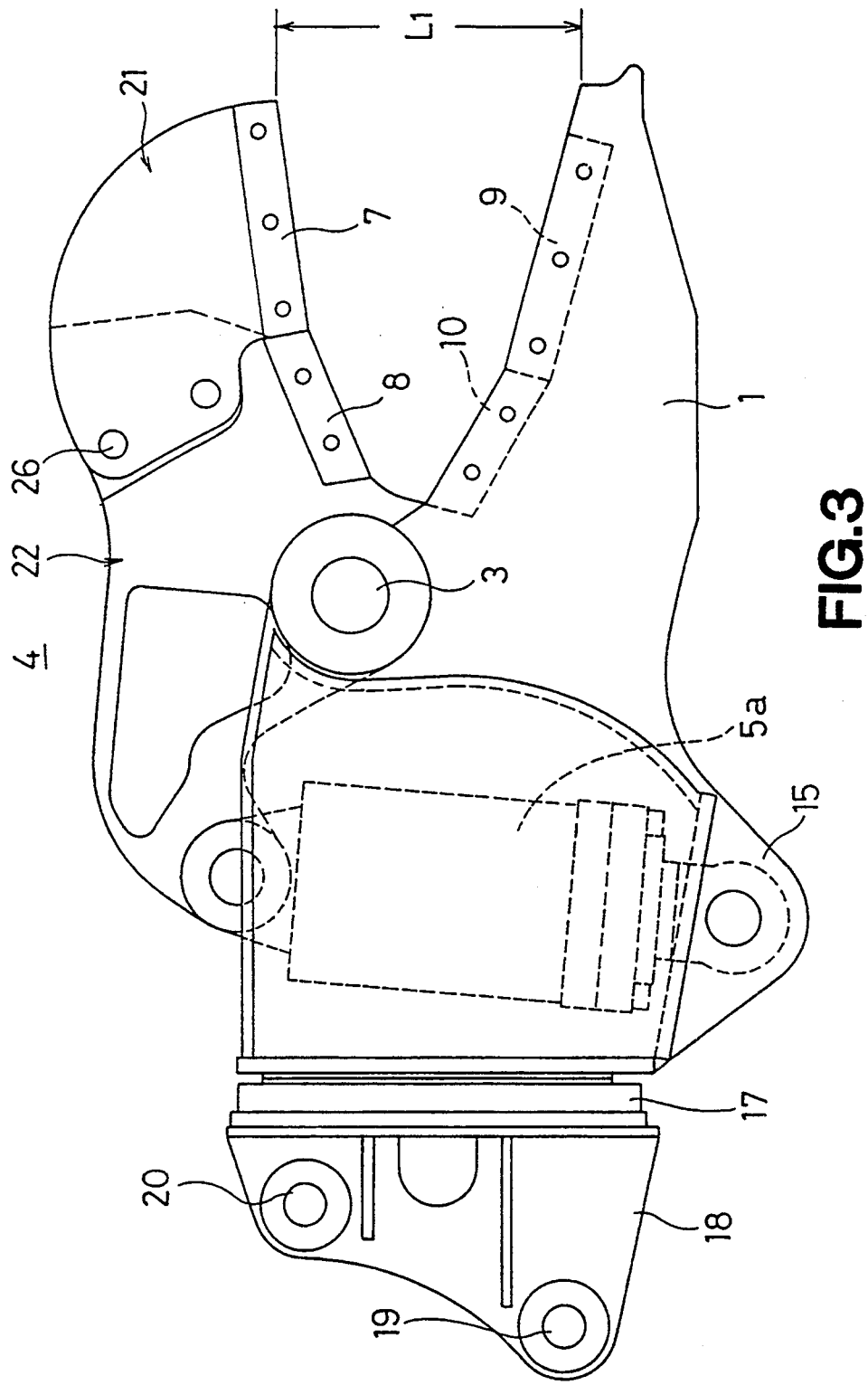
FIG. 3 is a side elevation view of the same embodiment with its jaws set to a larger maxim-are opening.

Thus, when the shear of the invention is set to the maximum degree of opening $L_1$ as shown in FIG. 3, it can be used to shear the reinforcing steel of a reinforced concrete building. On the other hand, when it is set to the maximum opening $L_2$ as shown in FIG. 4, the shear can be used to grip and shear the steel member lain on the ground, for instance.

It should be understood that while said projection 22a was described above as having bolt holes in two rows 24a ,25a , it may be provided with bolt holes in 3 or 4 rows.

A second embodiment of the present invention is now described with reference to FIG. 5. The parts corresponding to those of the first embodiment are not described and only the difference from the first embodiment is described below.

Figure 5:
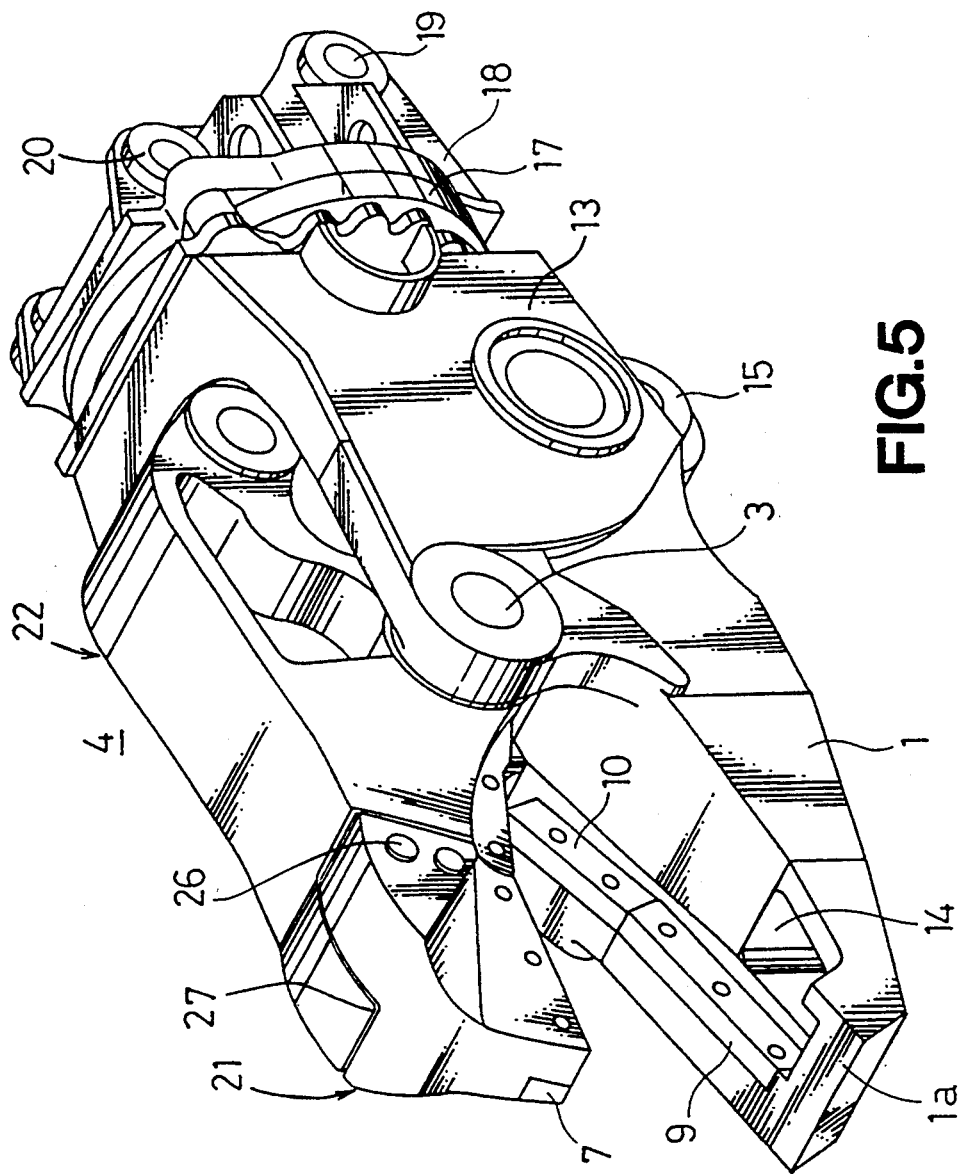
FIG. 5 is a perspective view showing a second embodiment of the invention.
Figure 6:
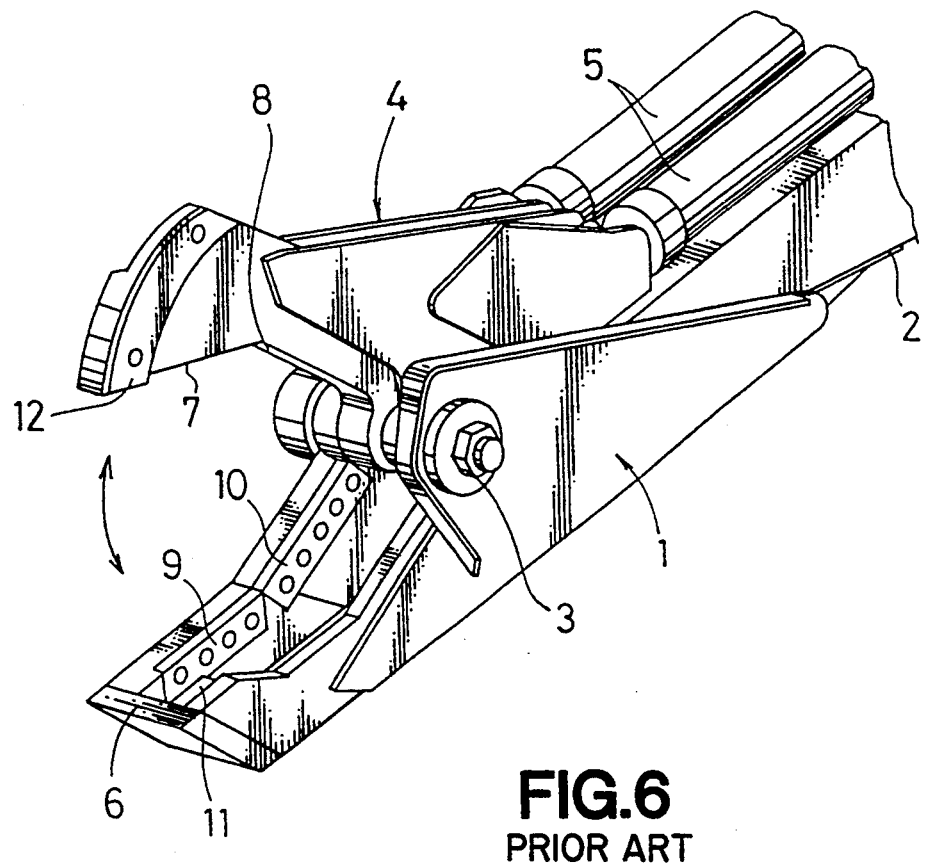
FIG. 6 is a perspective view showing the prior art shear.

As shown in FIG. 5, the forward upper jaw segment 21 is connected to the rear upper jaw segment 22 in a stepped arrangement 27, instead of the fork-and-tongue arrangement described for the first embodiment. The arrangement of bolt holes is the same as in the first embodiment. By this arrangement, too, the object of the invention can be effectively accomplished.

The steel shear of the present invention can be used not only in the demolition of buildings but also in the demolition of chemical plant pipelines, automobiles and so on.

Since, in the present invention, the hydraulic cylinder for driving the upper jaw is disposed in a substantially vertical position, the shear as a whole can be provided in a compact form. Moreover, since this shear is swingable, shearing can be performed in the optimum position. Installation of a hydraulic cylinder in a vertical position would limit the maximum opening of the upper jaw. However, since the upper jaw is divided into two segments which can be connected by bolts in a choice of positions in the present invention, the shear of the invention provides for a sufficiently large opening of the jaws. Moreover, the jaw opening is adjustable to cope with varying sizes of shearing loads.

What is claimed is:

1. A reinforcing steel shear device mountable at the free end of a construction machine arm comprising:

a shear body having a lower stationary jaw extending forwardly therefrom and a pivotal shaft at a proximal end of the lower stationary jaw;

an upper movable jaw swingably connected to said pivotal shaft;

a hydraulic cylinder associated with said shear body for opening and closing said upper jaw relative to said lower jaw;

means for swingably and coaxially attaching said shear body to said construction machine arm;

said upper jaw and lower jaw having an opposed inner faces, extending forwardly from said pivotal shaft, cutting edges configured generally in a chevron and an inverted chevron, respectively, when viewed laterally, said upper jaw including a distal end portion separate from the remainder of the upper jaw; and means for selectively fixing said distal end portion to the remainder of the upper jaw to define said chevron at a first angle and at a second angle greater than the first angle.

2. The reinforcing steel shear as claimed in claim 1, wherein said means for selectively fixing said distal end portion comprise a tongue member extending from the remainder of the upper jaw and an oppositely facing fork member extending from said distal end portion, said tongue member defining first and second rows of bolt holes disposed along a pair of angularly spaced lines, said fork member defining a single row of bolt holes to be registerable selectively with said first and second rows of bolt holes, a plurality of bolts received in said bolt holes for fixing said fork member and said tongue member in position together.

* * * * *